(12) United States Patent
Henderson et al.

(10) Patent No.: US 12,054,026 B2
(45) Date of Patent: Aug. 6, 2024

(54) WHEEL SUSPENSION CONTROL SYSTEM FOR A VEHICLE AND A METHOD OF CONTROLLING A SUSPENSION DEVICE

(71) Applicant: Volvo Truck Corporation, Gothenburg (SE)

(72) Inventors: Leon Henderson, Härryda (SE); Ramachandran Sandrasekaran, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 246 days.

(21) Appl. No.: 17/800,585

(22) PCT Filed: Feb. 18, 2021

(86) PCT No.: PCT/EP2021/054046
§ 371 (c)(1),
(2) Date: Aug. 18, 2022

(87) PCT Pub. No.: WO2021/170485
PCT Pub. Date: Sep. 2, 2021

(65) Prior Publication Data
US 2023/0097194 A1 Mar. 30, 2023

(30) Foreign Application Priority Data
Feb. 27, 2020 (IN) .............................. 202041008452

(51) Int. Cl.
*B60G 17/019* (2006.01)
*B60G 17/0195* (2006.01)
(Continued)

(52) U.S. Cl.
CPC . *B60G 17/01941* (2013.01); *B60G 17/01908* (2013.01); *B60G 17/0195* (2013.01);
(Continued)

(58) Field of Classification Search
CPC ........ B60G 17/01941; B60G 17/01908; B60G 17/0195; B60G 17/08; B60G 2204/115;
(Continued)

(56) References Cited

U.S. PATENT DOCUMENTS 4,700,972 A * 10/1987 Young ................ B60G 17/0195
280/5.521
6,471,407 B1 10/2002 Katano
(Continued)

FOREIGN PATENT DOCUMENTS

EP 1930708 A1 6/2008
JP 2007327645 A 12/2007
WO 03019126 A1 3/2003

OTHER PUBLICATIONS

Intention to Grant for European Patent Application No. 21706570.5, mailed Oct. 9, 2023, 31 pages.
(Continued)

*Primary Examiner* — Yuen Wong
(74) *Attorney, Agent, or Firm* — Withrow & Terranova, PLLC (57) ABSTRACT

The invention relates to a wheel suspension control system for a vehicle. The system comprises a suspension device, a wheel end bearing, at least one vibration sensor and a processing circuitry. The vibration sensor is provided at or in the wheel end bearing for measuring vibrations propagated from the road wheel to the wheel end bearing when the road wheel travels on a road having surface variations, wherein the vibration sensor is configured to transmit measurement signals representing the measured vibrations. The processing circuitry is configured to receive the transmitted measurement signals and to control at least one suspension parameter of the suspension device based on the received (Continued)

measurement signals. The invention also relates to a vehicle and to a method for controlling a suspension device.

15 Claims, 3 Drawing Sheets

(51) Int. Cl.
*B60G 17/08* (2006.01)
*F16C 19/38* (2006.01)
*F16C 19/52* (2006.01)

(52) U.S. Cl.
CPC ............ *B60G 17/08* (2013.01); *F16C 19/386* (2013.01); *F16C 19/527* (2013.01); *B60G 2204/115* (2013.01); *B60G 2204/418* (2013.01); *F16C 2326/02* (2013.01)

(58) Field of Classification Search
CPC .......... B60G 2204/418; B60G 2400/10; B60G 2400/102; B60G 2202/152; B60G 2400/821; B60G 2500/10; B60G 2500/20; B60G 2500/30; B60G 17/0165; B60G 17/019; F16C 19/386; F16C 19/527; F16C 2326/02
See application file for complete search history.

(56) References Cited

U.S. PATENT DOCUMENTS

| 8,086,371 | B2 | 12/2011 | Furuichi et al. |
| 9,327,572 | B2 | 5/2016 | May |
| 2002/0097040 | A1 | 7/2002 | Takizawa et al. |
| 2008/0144985 | A1 | 6/2008 | Joki et al. |
| 2019/0092338 | A1 | 3/2019 | Tsukasaki |

OTHER PUBLICATIONS

International Search Report and Written Opinion for International Patent Application No. PCT/EP2021/054046, mailed May 20, 2021, 16 pages.
International Preliminary Report on Patentability for International Patent Application No. PCT/EP2021/054046, mailed Jan. 10, 2022, 16 pages.

\* cited by examiner

FIG. 3 though the invention will be described with respect to a truck, the
WHEEL SUSPENSION CONTROL SYSTEM FOR A VEHICLE AND A METHOD OF CONTROLLING A SUSPENSION DEVICE This application is a 35 USC 371 national phase filing of International Application No. PCT/EP2021/054046, filed Feb. 18, 2021, which claims the benefit of Indian Patent Application No. 202041008452, filed Feb. 27, 2020, the disclosures of which are incorporated herein by reference in their entireties.

TECHNICAL FIELD

The invention relates to a wheel suspension control system for a vehicle. The invention also relates to a vehicle comprising such a wheel suspension control system. The invention further relates to a method of controlling a suspension device connected to a wheel axle carrying a road wheel. The invention additionally relates to a computer program, to a computer readable medium and to a processing circuitry, each of which implementing the steps of the method.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

The wheels of a vehicle, such as a truck, are normally connected to a respective wheel end hub. In its turn, the wheel end hub may be connected to a rotatable wheel axle, whereby rotation of the wheel axle is conveyed into rotation of the wheels. In order to provide a smooth ride, the vehicle may be provided with different types of wheel suspension devices to absorb undulations of the road or for absorbing shocks when the vehicle runs over a bump on the road.

In the case of transporting fragile and/or sensitive item, it may be desirable to have different suspension properties based on road conditions. In particular, different levels of road vibrations may call for different suspension settings, such as stiffness, damping and/or ride height.

SUMMARY

An object of the invention is to provide a wheel suspension control system for a vehicle, which takes road conditions into consideration. Another object of the invention is to provide a method of controlling a suspension device, which takes road conditions into consideration. These and other objects, which will become apparent in the following disclosure, are accomplished by means of the system and the method defined in the accompanying independent claims.

The present invention is based on the realization by the inventors that an adaptive suspension may be provided based on vibration measurements at or in the wheel end bearing in order to provide a smooth ride handling and protection of any cargo.

According to a first aspect of the present invention, there is provided a wheel suspension control system for a vehicle, comprising
 a suspension device operatively connectable to a wheel axle carrying a road wheel,
 a wheel end bearing operatively connectable to said road wheel,
 at least one vibration sensor provided at or in the wheel end bearing for measuring vibrations propagated from the road wheel to the wheel end bearing when the road wheel travels on a road having surface variations, wherein the vibration sensor is configured to transmit measurement signals representing the measured vibrations,
 a processing circuitry configured to receive the transmitted measurement signals, wherein the processing circuitry is configured to control at least one suspension parameter of the suspension device, such as stiffness, damping and/or ride height, based on the received measurement signals.

By the provision of a system which comprises a vibration sensor in or at the wheel end bearing, an accurate measurement of road vibrations can be made, and the parameters of the suspension can therefore adequately be controlled to cater for the current road conditions. Hereby, a smooth ride handling and an improved protection of any cargo is achieved. In particular it has been realized that the wheel end bearing is a very good location for making measurements. The vibrations at the wheel end bearing will accurately enough reflect the vibrations at the road wheel. In contrast, the vibrations at a suspension, such as the bellows of an air suspension, may be subjected to other vibrations as well (for example, due to acceleration or retardation), not only those emanating from road surface variations, and would therefore result in more of a challenge to determine which parts of the vibration come from the road surface variations.

By using a vibration sensor at the wheel end bearing, the processing circuitry can receive information of what type of road surface the vehicle is currently travelling on. For instance, small but frequent variations in the road surface may call for different parameter settings than large but not so frequent variations in the road surface. For example, gravelled road will provide different vibrations to the road wheels compared to a road surface made by cobbles.

The expression "processing circuitry" as used above should be understood to include any type of computing device, such as an ASIC, a micro-processor, etc. It should also be understood that the actual implementation of such a processing circuitry may be divided between more than a single device/circuit. For instance, one device/circuit of the processing circuitry may receive the transmitted measurement signals from the vibration sensor, while another device/circuit of the processing circuitry may control the suspension parameter of the suspension device. Thus, the processing circuitry may, for instance, comprise a sensor control unit and a suspension control unit. Of course, it is also conceivable that the processing circuitry has only one device/circuit which is used for performing all functions.

The processing circuitry may have a calculating and/or computing function and may be configured to classify the type of road roughness, and adjust the suspension parameter of the suspension device depending on the classification. Thus, the processing circuitry may be configured to identify one of a plurality of pre-defined types of road roughness.

According to at least one exemplary embodiment, the vibration sensor is spaced apart from the suspension device. As mentioned above, the suspension device which is to be controlled, may itself be subjected to various sources of vibration, and not only from varying road surface. Therefore, to avoid errors in measurements with respect to road surface-caused vibrations, the vibration device may suitably be spaced apart from the suspension device.

According to at least one exemplary embodiment, the wheel end bearing comprises an inboard bearing and an outboard bearing, wherein the vibration sensor is located at (or in) the inboard bearing. This is advantageous since placing the vibration sensor at (or in) the inboard bearing facilitates any wiring routing from the vibration sensor and its connection to the processing circuitry, compared to placing the vibration sensor at (or in) the outboard bearing. The inboard bearing is configured to be located closest to a central longitudinal axis of the vehicle. The outboard bearing is configured to be located furthest away from the central longitudinal axis of the vehicle.

According to at least one exemplary embodiment, the vibration sensor is located on an inboard side of the inboard bearing. This further facilitates the wiring routing.

According to at least one exemplary embodiment, the wheel suspension control system further comprises a central wheel support member such as a spindle or a steering knuckle, wherein the vibration sensor is located between the inboard bearing and the central wheel support member. This too facilitates the wiring routing.

From the above, it should be understood that in at least some exemplary embodiments, the vibration sensor may communicate with the processing circuitry via a wired connection. However, it is conceivable, in other exemplary embodiments, to instead (or additionally) provide for a wireless communication of signals between the vibration sensor and the processing circuit.

According to at least one exemplary embodiment, the suspension device comprises an air suspension, such as including a bellows, wherein the processing circuitry is configured to adjust the air pressure in the suspension device based on the received measurement signals. By adjusting the air pressure to the road vibrations a smooth ride handling and protection of cargo can be achieved. From the above, it is understood that according to at least one exemplary embodiment, the processing circuitry is configured to adjust the air pressure in a bellows of the suspension device.

According to at least one exemplary embodiment, the suspension device comprises a shock absorber, wherein there processing circuitry is configured to adjust the damping coefficient of the shock absorber based on the received measurement signals. By adjusting the damping coefficient to the road vibrations a smooth ride handling and protection of cargo can be achieved. Any suitable shock absorber may be implemented. Some non-limiting examples are presented below.

For instance, according to at least one exemplary embodiment, the suspension device comprises a shock absorber, wherein the shock absorber comprises a cylinder in which hydraulic fluid is housed and a piston movable inside the cylinder, wherein the piston is provided with at least one hole and/or valve defining an opening area allowing hydraulic fluid to pass through the piston, wherein the processing circuitry is configured to adjust the damping coefficient of the shock absorber, such as by adjusting the opening area, based on the received measurement signals.

According to at least some exemplary embodiments, the shock absorber may comprise a cylinder having a magnetic fluid, wherein its viscosity is adjustable via electromagnets. The processing circuitry may thus be configured to adjust the damping coefficient of the shock absorber by controlling the electromagnets for adjusting the viscosity, based on the received measurement signals.

According to at least one exemplary embodiment, the processing circuitry is configured to adjust the suspension, such as the suspension length, to adjust the ride height (ground clearance). A lower ride height reduces the risk of rollover, while a higher ride height reduces the risk of the road scraping against the chassis (when driven on very bumpy roads).

According to at least one exemplary embodiment, the processing circuitry is configured to control two, three, four or more suspension devices, in particular to control at least one suspension parameter of the respective suspension device, such as stiffness, damping and/or ride height, based on the received measurement signals. The various controlled suspension devices may be of the same type or of different types. For instance, the processing circuitry may be configured to control suspension parameters of both an air suspension and a shock absorber, suitably simultaneously.

According to at least one exemplary embodiment, the vibration sensor comprises at least one accelerometer. An accelerometer provides reliable measurements, having a good range of frequencies, suitable for both low frequency and high frequency vibrations. Other conceivable vibration sensors are strain gauge sensors and eddy current sensors.

According to at least some exemplary embodiments, the system comprises two, three or more vibration sensors, such as two, three or more accelerometers. By placing them at different locations around the wheel end bearing acceleration forces in different directions can be measured. Suitable, when using one or more accelerometer, at least one of the acceleration sensors should be positioned to measure vertical acceleration forces, i.e. vertical vibrations. In this connection the term vertical is understood to be the direction perpendicular to the ground on which the vehicle travels (irrespective of if the road extends up or down a hill, or simply extends along a planar field). For example, to measure the vertically directed vibrations, the accelerometer may be attached vertically above or vertically below the wheel end bearing.

According to at least some exemplary embodiments, the vibration sensor, such as an accelerometer, is circular. The circularity of the vibration sensor may follow the circularity of the wheel end bearing. Thus, the vibration sensor may suitably extend around a support member such as a spindle or a steering knuckle.

According to at least one exemplary embodiment, the processing circuitry is configured to adjust the vehicle speed, by controlling a propulsion unit of the vehicle, based on the received measurement signals. This is advantageous as the processing circuitry may, for instance, provide for a reduction of vehicle speed in the case of intense vibrations in order to protect any cargo carried by the vehicle. If there is no or very small vibrations, for example on an even-surfaced planar road section, the processing circuitry may allow a higher vehicle speed.

According to a second aspect of the invention, there is provided a vehicle comprising a wheel suspension control system according to the first aspect, including any embodiment thereof. The vehicle further comprises a wheel axle carrying a road wheel, wherein the suspension device is operatively connected to the wheel axle, wherein the wheel end bearing is operatively connected to the road wheel. The advantages of different exemplary embodiments of the vehicle of the second aspect are generally analogous to the advantages of the exemplary embodiments of the wheel suspension control system according to the first aspect.

Similarly to the above features of the second aspect, in some exemplary embodiments of the first aspect, the wheel suspension control system comprises the wheel axle, wherein the suspension device is operatively connected to the wheel axle carrying the road wheel. In at least some exemplary embodiments of the first aspect, the wheel suspension system comprises the road wheel, wherein the wheel end bearing is operatively connected to the road wheel.

According to a third aspect of the invention, there is provided a method of controlling a suspension device connected to a wheel axle carrying a road wheel, comprising:

providing at least one vibration sensor at or in a wheel end bearing connected to said road wheel, measuring, by means of the vibration sensor, vibrations propagated from the road wheel to the wheel end bearing when the road wheel travels on a road having surface variations, transmitting measurement signals representing the measured vibrations, receiving, by a processing circuitry, the transmitted measurement signals, and controlling, by the processing circuitry, at least one suspension parameter of the suspension device, such as stiffness, damping and/or ride height of the suspension device, based on the received measurement signals.

The advantages of different exemplary embodiments of the method of the third aspect are generally analogous to the advantages of the exemplary embodiments of the wheel suspension control system according to the first aspect, and of the vehicle according to the second aspect. Some exemplary embodiments of the method according to the third aspect are presented herein below.

According to at least one exemplary embodiment, the suspension device comprises an air suspension, such as including a bellows, wherein the method comprises:

adjusting, by means of the processing circuitry, the air pressure in the suspension device based on the received measurement signals.

According to at least one exemplary embodiment, the suspension device comprises a shock absorber, wherein the method comprises:

adjusting, by means of the processing circuitry, the damping coefficient of the shock absorber, based on the received measurement signals.

According to at least on exemplary embodiment, the suspension device comprises a shock absorber, wherein the shock absorber comprises a cylinder in which hydraulic fluid is housed and a piston movable inside the cylinder, wherein the piston is provided with at least one hole and/or valve defining an opening area allowing hydraulic fluid to pass through the piston, wherein the method comprises:

adjusting, by means of the processing circuitry, the damping coefficient of the shock absorber, such as by adjusting the flow opening area, based on the received measurement signals.

According to at least one exemplary embodiment, the suspension device comprises a shock absorber, wherein the shock absorber comprises a cylinder in which a magnetic fluid is housed, wherein the viscosity of the fluid is adjustable with electromagnets, wherein the method comprises:

adjusting, by means of the processing circuitry, the damping coefficient of the shock absorber, by controlling the electromagnets for adjusting the viscosity of the fluid, based on the received measurement signals.

According to at least one exemplary embodiment, the method comprises:

adjusting, by means of the processing circuitry, the vehicle speed, by controlling a propulsion unit of the vehicle, based on the received measurement signals.

According to at least one exemplary embodiment, the method is for use in a wheel suspension control system according to the first aspect (including any embodiment thereof) or in a vehicle according to the second aspect (including any embodiment thereof).

According to a fourth aspect of the invention, there is provided a computer program comprising program code means for performing the steps of the method of the third aspect (including any embodiment thereof) when said program is run on a computer.

According to a fifth aspect of the invention, there is provided a computer readable medium carrying a computer program comprising program code means for performing the steps of the method of the third aspect (including any embodiment thereof) when said program product is run on a computer.

According to a sixth aspect of the invention, there is provided a processing circuitry for controlling a suspension parameter of a suspension device, the processing circuitry being configured to perform the steps of the method of the third aspect (including any embodiment thereof).

The advantages of fourth, fifth and sixth aspects are generally analogous to the advantages of the exemplary embodiments of the wheel suspension control system according to the first aspect, the vehicle according to the second aspect, and the method according to the third aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
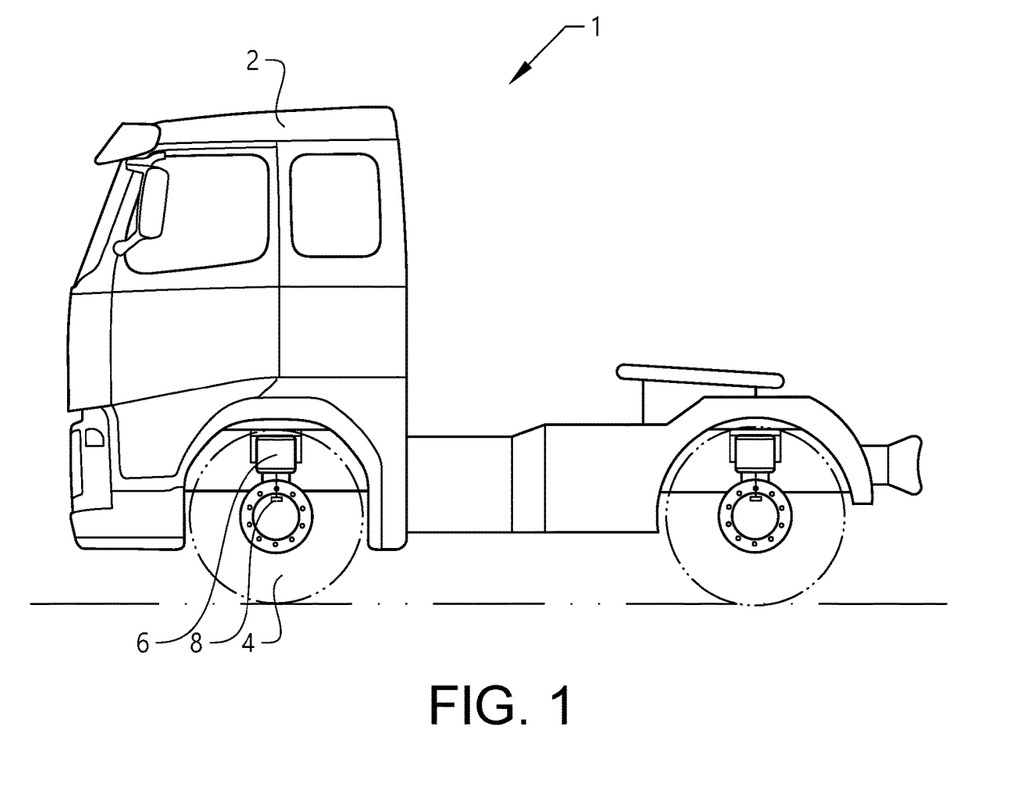
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle) comprises a cab 2 in which a driver may operate the vehicle 1. The vehicle 1 comprises a number of road wheels 4, herein illustrated as two pairs of wheels, however in other embodiments there may be a different number of wheels, such as three pairs, four pairs or more. The rotation of the wheels 4 is facilitated by means of wheel end bearings (not shown in FIG. 1). The vehicle comprises 1 a wheel end assembly in which such a wheel end bearing is included, which wheel end assembly will be further discussed in connection with FIG. 2.

FIG. 1 illustrates that for each road wheel 4 a suspension device 6 is operatively connected to a wheel axle carrying the road wheel 4. The suspension device 6 is here illustrated as an air suspension such as including a bellows. However, the general inventive concept is applicable to other suspension devices as well, such as shock absorbers. A vibration sensor 8, such as an accelerometer, is schematically illustrated. It is provided at or in the wheel end bearing and configured to communicate with a processing circuitry (not shown in FIG. 1). The processing circuitry is configured to receive measurement signals (by wire or wirelessly) transmitted from the vibration sensor 8, and configured to control a suspension parameter of the suspension device 6, based on the received measurement signals.

The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device.

Figure 2:
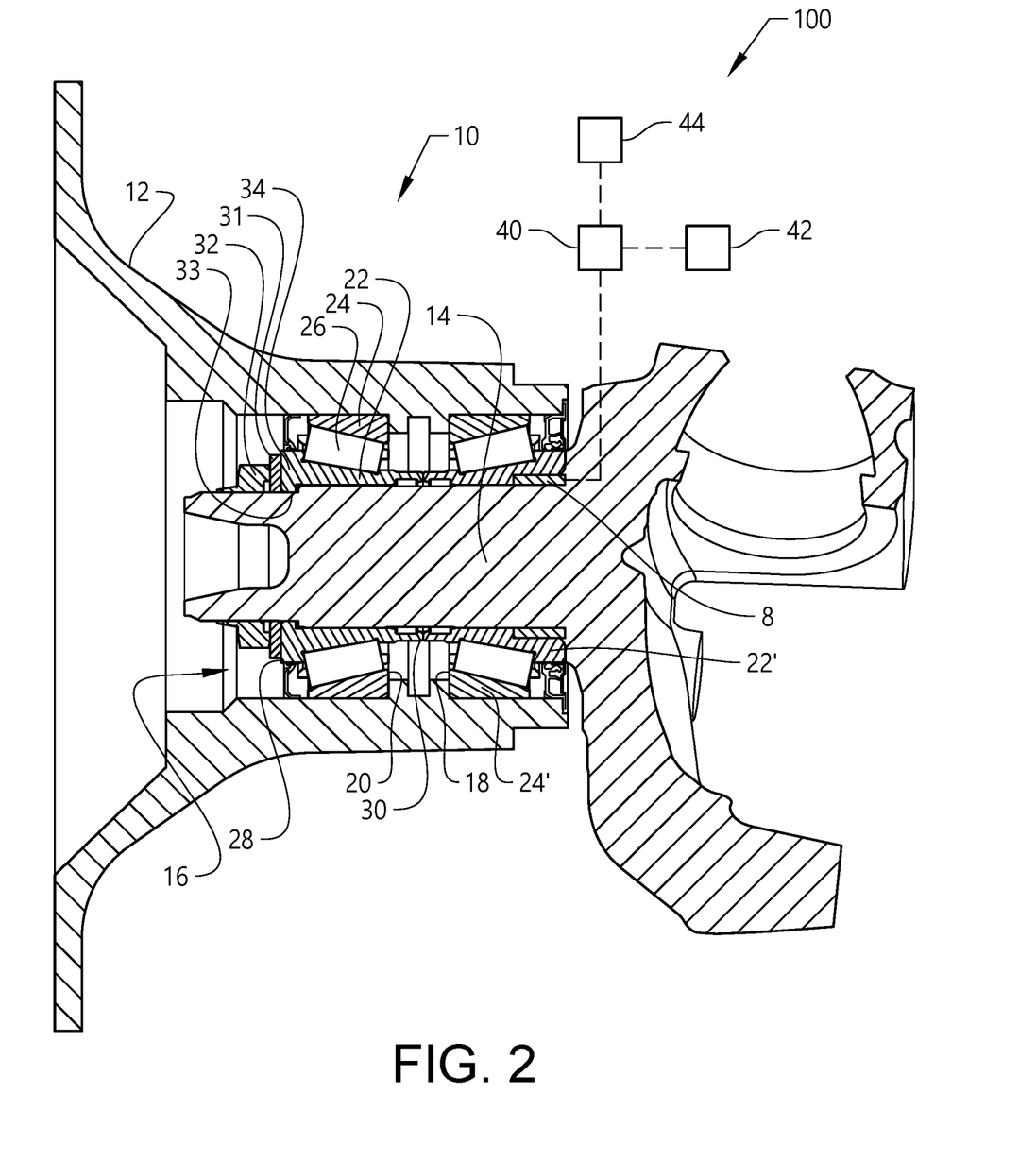
FIG. 2 illustrates a wheel suspension control system in accordance with at least one exemplary embodiment of the invention, provided at a wheel end assembly.

FIG. 2 illustrates a wheel suspension control system 100 in accordance with at least one exemplary embodiment of the invention, provided at a wheel end assembly 10. The wheel suspension control system 100 may suitably be implemented in a vehicle such as the vehicle illustrated in FIG. 1. The wheel end assembly 10 comprises a wheel end hub 12, which is configured to receive and hold a road wheel (not illustrated in FIG. 2). The wheel end hub 12 is rotationally mounted to a central wheel support member 14 via a wheel end bearing 16.

In FIG. 2 the central wheel support member 14 has been illustrated in the form of a steering knuckle, which may typically be provided at the front wheels of a vehicle. The knuckle is solid and used for non-driven wheels. However, it should be understood that the inventive principle could also be used in relation to a wheel support member in the form of a hollow spindle. A hollow/tubular spindle may typically be provided at the rear wheels of a vehicle and is used in connection with driven wheels. Normally, a drive shaft or axle extends through the spindle and is fixed to the outside of the wheel end hub for propulsion of the wheel.

The wheel end bearing 16 comprises an inboard bearing 18 and an outboard bearing 20, each of which is concentrically arranged around the central wheel support member 14. Of the two, it is the inboard bearing 18 which is configured to be located closest to a central longitudinal axis of the vehicle. Conversely, of the two, it is the outboard bearing 20 which is configured to be located furthest away from the central longitudinal axis of the vehicle.

The outboard bearing 20 comprises an inner-race forming part 22 and an outer race-forming part 24. The outboard bearing 20 also comprises roller elements 26 accommodated between the inner race-forming part 22 and the outer race-forming part 24. The roller elements 26 may suitably be circumferentially separated from each other by a cage having individual holes for each roller element. The relative motions of the inner and outer race-forming parts 22, 24 causes the roller elements 26 to roll with very little rolling resistance. The inner race-forming part 22 may also be referred to as an inner ring and the outer race-forming part 24 may also be referred to as an outer ring. In a similar way, the inboard bearing 18 comprises roller elements accommodated between an inner race-forming part 22' and an outer race-forming part 24'.

The outboard bearing 20 has an outboard periphery 28 intended to face away from the central longitudinal axis of the vehicle and an inboard periphery 30 intended to face towards the central longitudinal axis of the vehicle.

A lock washer 31 is provided at the outboard periphery 28 of the inner-race-forming part 22. A hub nut 32, which comprises an inner threading is mounted to the central wheel support member 14, which has corresponding outer threading, allowing the hub nut 32 to be threaded onto the central wheel support member 14. The hub nut 32 is tightened to come into contact with a lock washer 31, thus arranged between the hub nut 32 and the inner race-forming part 22, in particular with the outboard periphery 28 of the inner race-forming part 22.

In its turn, the inner race-forming part 22 of the outboard bearing 20 (and similarly the inner race-forming part 22' of the inboard bearing 18) is mounted to the central wheel support member 14.

The wheel end bearing 16 forms part of the wheel suspension control system 100. The wheel suspension control system 100 also comprises a vibration sensor 8 (such as the one illustrated in FIG. 1) provided at or in the wheel end bearing 16, attached to a surface of the wheel end bearing 16. The vibration sensor 8 is herein illustrated as extending circularly around the support member 14, however, in other exemplary embodiments the vibration sensor may be limited to one part of the circumference of the support member 14. In some exemplary embodiments, further vibration sensors may be provided. The vibration sensor 8 measures vibrations propagating from the road wheel to the wheel end bearing 16 when the road wheel travels on a road having surface variations. The vibration sensor 8 is configured to transmit measurement signals representing the measured vibrations.

The wheel suspension control system 100 further comprises a processing circuitry 40 configured to receive the transmitted measurement signal. The wheel suspension control system 100 further comprises a schematically depicted suspension device 42. The suspension device 42 may be in the form of an air suspension as exemplified by the suspension device 6 in FIG. 1, or it may be a hydraulic suspension. For instance, the suspension device 42 may be may be a shock absorber. Furthermore, the wheel suspension control system 100 may comprise more than one suspension device 42.

Based on the measurement signals received from the vibration sensor 8, the processing circuitry 40 is configured to control at least one suspension parameter of the suspension device 42 (and any other suspension device comprised in the wheel suspension control system 100). The suspension parameter may for instance be stiffness, damping, ride height, etc.

The processing circuitry 40 may include various control units, such as a sensor control unit receiving the measurement signals and then transmitting a command signal to a suspension control unit configured to adjust the suspension parameter.

The vibration sensor 8 is spaced apart from the suspension device 42, thus other vibrations than road vibrations, which may affect the suspension device 42, are not transmitted from the suspension device 42 to the vibration sensor 8.

As illustrated in FIG. 2, the vibration sensor 8 may be located at or in the inboard bearing 18. However, in other exemplary embodiments it is conceivable to provide the vibration sensor 8, or an additional vibration sensor, at or in the outboard bearing 20.

As illustrated in FIG. 2, the vibration sensor 8 may be located at an inboard side of the inboard bearing 18. However, in other exemplary embodiments it is conceivable to provide the vibration sensor 8, or an additional vibration sensor, at an outboard side of the inboard bearing 18.

As illustrated in FIG. 2, the vibration sensor 8 may be located at the inner race-forming part 22' of the inboard bearing 18. However, in other exemplary embodiments it is conceivable to provide the vibration sensor 8, or an additional vibration sensor, at the outer race-forming part 24' of the inboard bearing 18.

FIG. 2 further illustrates that the vibration sensor 8 may be located between the inboard bearing 18 (such as at its inner race-forming part 22') and the central wheel support member 14. The central wheel support member may form part of the wheel suspension control system 100 in at least some exemplary embodiments.

As mentioned previously, the suspension device 42 may comprises an air suspension, such as including a bellows, wherein the processing circuitry 40 is configured to adjust the air pressure in the suspension device (e.g. the air pressure in a bellows) based on the measurement signals received from the vibration sensor 8. In other exemplary embodiments, the suspension device 42 may comprise a shock absorber, wherein the shock absorber comprises a cylinder in which hydraulic fluid is housed and a piston movable inside the cylinder, wherein the piston is provided with at least one hole and/or valve defining an opening area allowing hydraulic fluid to pass through the piston, wherein the processing circuitry 40 is configured to adjust the damping coefficient of the shock absorber, such as by adjusting the opening area, based on the measurement signals received from the vibration sensor 8.

In at least some exemplary embodiments, the processing circuitry 40 may be configured to adjust the vehicle speed, by controlling (with a control signal) a propulsion unit 44 of the vehicle, based on the measurement signals received by from the vibration sensor 8. In some exemplary embodiments, the propulsion unit 44 may be comprised in the wheel suspension control system 100.

Thus, depending on the type of vibrations, size, frequency, etc. that are measured by the vibration sensor 8, the processing circuitry 40 may, control both the suspension device 42 (i.e. a suspension parameter thereof) and the propulsion unit 44. For instance the processing circuitry 40 may determine that the stiffness, damping and/or ride height should be increased or decreased while also increasing or decreasing the velocity of the vehicle. Suitably, such determinations may be based on a classification of the type of road on which the vehicle is currently travelling, wherein different pre-defined types of roads may activate different control settings stored in a memory of the processing circuitry 40.

Figure 3:
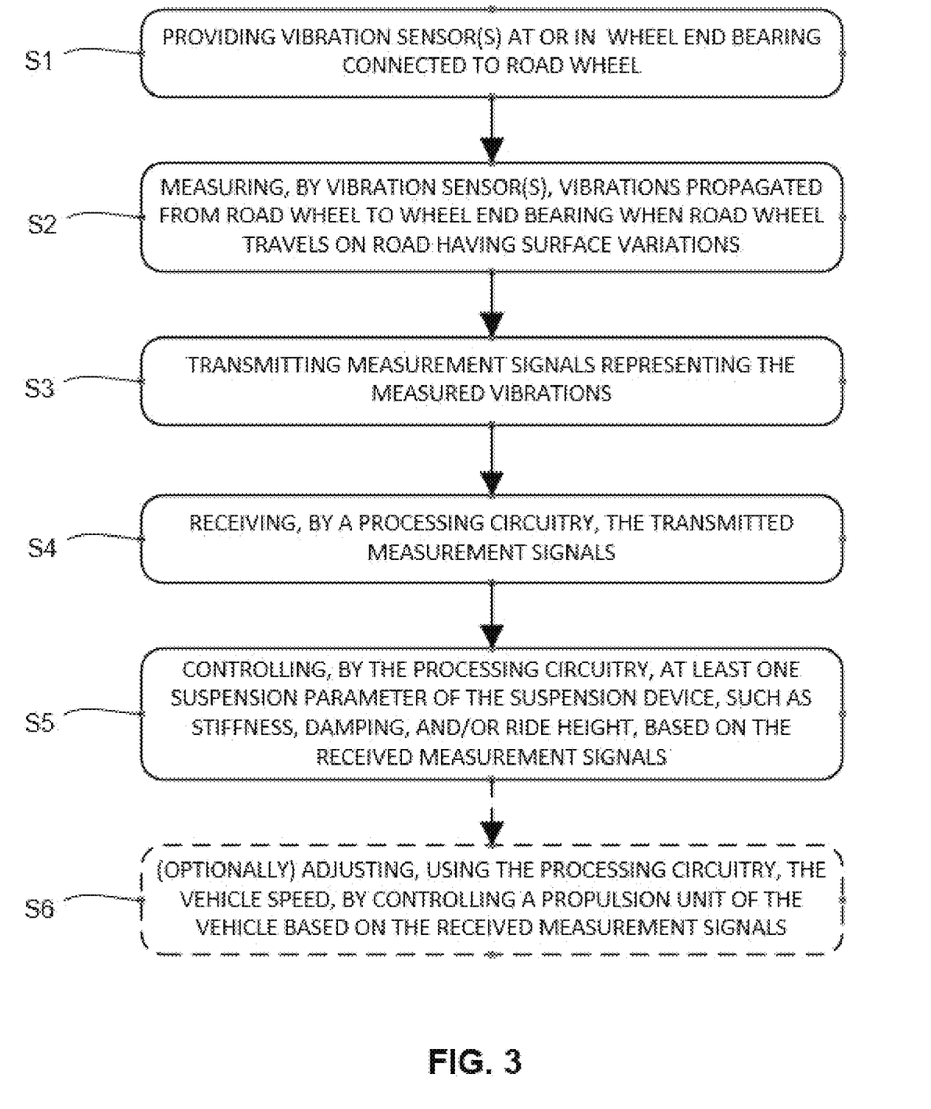
FIG. 3 is a schematic illustration of a method in accordance with at least one exemplary embodiment of the invention.

FIG. 3 is a schematic illustration of a method 200 in accordance with at least one exemplary embodiment of the invention. The method 200 is a method of controlling a suspension device (such as suspension devices 6 and 42 illustrated in FIGS. 1 and 2) connected to a wheel axle carrying a road wheel. The method 200 comprises:

in a step S1, providing at least one vibration sensor at or in a wheel end bearing connected to said road wheel, in a step S2, measuring, by means of the vibration sensor, vibrations propagated from the road wheel to the wheel end bearing when the road wheel travels on a road having surface variations, in a step S3, transmitting measurement signals representing the measured vibrations, in a step S4, receiving, by a processing circuitry, the transmitted measurement signals, and in a step S5, controlling, by the processing circuitry, at least one suspension parameter of the suspension device, such as stiffness, damping and/or ride height of the suspension device, based on the received measurement signals.

It should be noted that the steps S1-S5 do not always have to be performed as consecutive steps. Suitably, each one of steps S2-S5 may be performed simultaneously, as the vibration sensor may continuously measure the vibrations and the processing circuitry may continuously control the suspension parameters as it continuously receives measurement signals from the vibration sensor.

In at least some exemplary embodiments, the step S5 may comprise (for a suspension device comprising an air suspension, such as including a bellows), adjusting, by means of the processing circuitry, the air pressure in the suspension device based on the received measurement signals. In at least some exemplary embodiments the step S5 may comprise (for a suspension device comprising a shock absorber, wherein the shock absorber comprises a cylinder in which hydraulic fluid is housed and a piston movable inside the cylinder, wherein the piston is provided with at least one hole and/or valve defining an opening area allowing hydraulic fluid to pass through the piston), adjusting, by means of the processing circuitry, the damping coefficient of the shock absorber, such as by adjusting the flow opening area, based on the received measurement signals. In some exemplary embodiments, the step S5 may comprise adjusting both the air pressure of an air suspension and the damping coefficient of a shock absorber, and/or a ride height of the vehicle.

The method 200 may optionally comprise:

in a step S6, adjusting, by means of the processing circuitry, the vehicle speed, by controlling a propulsion unit of the vehicle, based on the received measurement signals.

It should be noted that step S6 may be performed at the same time as for instance step S5.

There may be provided a computer program comprising program code means for performing the steps S1-S6 when said program is run on a computer. Similarly, there may be provided a computer readable medium carrying a computer program comprising program code means for performing the steps S1-S6 when said program product is run on a computer. A processing circuitry (such as the processing circuitry 40 in FIG. 2) may be provided for controlling a suspension parameter of a suspension device (such as suspension device 6, 42 in FIG. 1 and FIG. 2), the processing circuitry being configured to perform the steps S1-S6.

It is to be understood that the present invention is not limited to the embodiments described above and illustrated in the drawings; rather, the skilled person will recognize that many changes and modifications may be made within the scope of the appended claims.

The invention claimed is:

1. A wheel suspension control system for a vehicle, comprising:
   a suspension device operatively connectable to a wheel axle carrying a road wheel;
   a wheel end bearing operatively connectable to the road wheel;
   a vibration sensor provided at the wheel end bearing for measuring vibrations propagated from the road wheel to the wheel end bearing when the road wheel travels on a road having surface variations, wherein the vibration sensor is configured to transmit measurement signals representing the measured vibrations due to the road surface variations; and a processing circuitry configured to receive the transmitted measurement signals, wherein the processing circuitry is configured to control at least one suspension parameter of the suspension device, the at least one suspension parameter comprising at least one of stiffness, damping or ride height, based on the received measurement signals, wherein the wheel end bearing comprises an inboard bearing and an outboard bearing, wherein the vibration sensor is located at the inboard bearing, and wherein the wheel suspension control system further comprises a central wheel support member that comprises at least one of a spindle or a steering knuckle, wherein the vibration sensor is located between the inboard bearing and the central wheel support member.

2. The wheel suspension control system of claim 1, wherein the vibration sensor is spaced apart from the suspension device.

3. The wheel suspension control system of claim 2, wherein the vibration sensor is located on an inboard side of the inboard bearing.

4. The wheel suspension control system of claim 1, wherein the suspension device comprises an air suspension, wherein the processing circuitry is configured to adjust air pressure in the suspension device based on the received measurement signals.

5. The wheel suspension control system of claim 1, wherein the suspension device comprises a shock absorber, wherein the shock absorber comprises a cylinder in which hydraulic fluid is housed and a piston movable inside the cylinder, wherein the piston is provided with at least one hole and/or valve defining an opening area allowing hydraulic fluid to pass through the piston, wherein the processing circuitry is configured to adjust a damping coefficient of the shock absorber by adjusting the opening area, based on the received measurement signals.

6. The wheel suspension control system of claim 1, wherein the vibration sensor comprises at least one accelerometer.

7. The wheel suspension control system of claim 1, wherein the processing circuitry is configured to adjust speed of the vehicle, by controlling a propulsion unit of the vehicle, based on the received measurement signals.

8. The wheel suspension control system of claim 1, wherein the air suspension includes a bellows.

9. A vehicle comprising the wheel suspension control system of claim 1.

10. A method of controlling a suspension device connected to a wheel axle carrying a road wheel, comprising:
providing a vibration sensor at a wheel end bearing connected to the road wheel, wherein the wheel end bearing comprises an inboard bearing and an outboard bearing, and wherein the vibration sensor is provided between the inboard bearing and a central wheel support member that comprises at least one of a spindle or a steering knuckle;

measuring, by means of the vibration sensor, vibrations propagated from the road wheel to the wheel end bearing when the road wheel travels on a road having surface variations;

transmitting measurement signals representing the measured vibrations due to the road surface variations;

receiving, by a processing circuitry, the transmitted measurement signals; and controlling, by the processing circuitry, at least one suspension parameter of the suspension device, the at least one suspension parameter comprising at least one of stiffness, damping or ride height, based on the received measurement signals.

11. The method of claim 10, wherein the suspension device comprises an air suspension, wherein the method comprises:
adjusting, by means of the processing circuitry, air pressure in the suspension device based on the received measurement signals.

12. The method of claim 10, wherein the suspension device comprises a shock absorber, wherein the shock absorber comprises a cylinder in which hydraulic fluid is housed and a piston movable inside the cylinder, wherein the piston is provided with at least one hole and/or valve defining an opening area allowing hydraulic fluid to pass through the piston, wherein the method comprises:
adjusting, by means of the processing circuitry, a damping coefficient of the shock absorber by adjusting the flow opening area, based on the received measurement signals.

13. The method of claim 10, comprising:
adjusting, by means of the processing circuitry, speed of the vehicle, by controlling a propulsion unit of the vehicle, based on the received measurement signals.

14. The method of claim 10, wherein the air suspension includes a bellows.

15. A processing circuitry for controlling a suspension parameter of a suspension device that is operatively connected to a wheel axle carrying a road wheel of a vehicle, the processing circuitry comprising at least one processor configured to:
receive from a vibration sensor at a wheel end bearing connected to the road wheel of the vehicle, measurement signals representing vibrations propagated from the road wheel to the wheel end bearing when the road wheel travels on a road having surface variations, the vibrations being due to the road surface variations; and control at least one suspension parameter of the suspension device, the at least one suspension parameter comprising at least one of stiffness, damping or ride height, based on the received measurement signals.

* * * * *